United States Patent
Liang et al.

(10) Patent No.: US 12,531,299 B2
(45) Date of Patent: Jan. 20, 2026

(54) METHOD FOR MANUFACTURING A TOP COVER ASSEMBLY

(71) Applicant: Hithium Tech HK Limited, Kowloon (HK)

(72) Inventors: Jinyun Liang, Fujian (CN); Liangliang Zhang, Fujian (CN); Wancai Zhang, Fujian (CN); Ming Yang, Fujian (CN)

(73) Assignee: HITHIUM TECH HK LIMITED, Kowloon (HK)

( * ) Notice: Subject to any disclaimer, the term of this patent is extended or adjusted under 35 U.S.C. 154(b) by 182 days.

(21) Appl. No.: 18/232,627

(22) Filed: Aug. 10, 2023

(65) Prior Publication Data

US 2024/0162542 A1 May 16, 2024

(30) Foreign Application Priority Data

Nov. 11, 2022 (CN) .......................... 202211416057.0

(51) Int. Cl.
  *B29C 45/14* (2006.01)
  *H01M 50/166* (2021.01)
  *H01M 50/566* (2021.01)
  *B29L 31/34* (2006.01)

(52) U.S. Cl.
  CPC ..... *H01M 50/166* (2021.01); *B29C 45/14467* (2013.01); *H01M 50/566* (2021.01); *B29L 2031/3468* (2013.01)

(58) Field of Classification Search
  CPC .............................................. B29C 45/14467
  See application file for complete search history.

(56) References Cited

U.S. PATENT DOCUMENTS

2019/0319227 A1* 10/2019 Chen ................ B29C 45/14467

FOREIGN PATENT DOCUMENTS

| CN | 203415649 U | | 1/2014 |
| CN | 108767143 A | | 11/2018 |
| CN | 108963122 A | | 12/2018 |
| CN | 208256767 | * | 12/2018 |
| CN | 208478389 U | | 2/2019 |
| CN | 111599953 A | | 8/2020 |
| CN | 112736339 | * | 4/2021 |
| CN | 215869579 | * | 2/2022 |

(Continued)

OTHER PUBLICATIONS

Notice of First Review Opinion dated Dec. 19, 2022 received in Chinese Patent Application No. CN 202211416057.0.

(Continued)

*Primary Examiner* — Edmund H Lee
(74) *Attorney, Agent, or Firm* — Scully, Scott, Murphy & Presser, P.C.

(57) ABSTRACT

A manufacturing method of a top cover assembly, a top cover assembly and an energy storage device are provided. The method includes: providing a top cover plate, which is provided with an outlet hole; placing an electrode terminal above one side of the top cover plate to cover the outlet hole, so that a first space is defined between the top cover plate and the electrode terminal; placing a connector on the side of the top cover plate that is used for placing the electrode terminal. The connector has a first end portion surrounding a peripheral surface of the electrode terminal, and the connector has a second end portion in contact with the top cover plate.

7 Claims, 5 Drawing Sheets

(56) References Cited

FOREIGN PATENT DOCUMENTS

| CN | 215869579 U | | 2/2022 |
|---|---|---|---|
| CN | 114361667 A | | 4/2022 |
| CN | 115458875 A | | 12/2022 |
| EP | 2393138 | * | 12/2011 |
| JP | 3238242 U | | 7/2022 |
| KR | 20060085875 | * | 7/2006 |
| WO | WO2020199940 | * | 10/2020 |

OTHER PUBLICATIONS

Notice of Second Review Opinion dated Jan. 18, 2023 received in Chinese Patent Application No. CN 202211416057.0.

* cited by examiner

A-A

METHOD FOR MANUFACTURING A TOP COVER ASSEMBLY

CROSS-REFERENCE TO RELATED APPLICATION

This application claims priority to Chinese Patent Application No.: 202211416057.0, filed on Nov. 11, 2022, which is incorporated herein by reference in its entirety.

TECHNICAL FIELD

The present disclosure relates to the technical field of new energy, and in particular, to a manufacturing method of a top cover assembly, a top cover assembly and an energy storage device.

BACKGROUND

A top cover assembly of an energy storage device in the related technology generally includes a top cover plate and an electrode terminal. The electrode terminal includes a base portion and an extension portion arranged on the base portion. The top cover plate is provided with an outlet hole. A diameter of the base portion is greater than a hole diameter of the outlet hole, and a diameter of the extension portion is less than the hole diameter of the outlet hole. When the electrode terminal is connected with the top cover plate, the base portion resists against a lower surface of the top cover plate (that is, the base portion is located below the top cover plate and inside a housing of the energy storage device), and the extension portion is exposed out of an upper surface of the top cover plate through the outlet hole, and is then fixed to the top cover plate by using a circlip or by means of riveting, so as to achieve an objective of connecting the electrode terminal with the top cover plate.

However, since the extension portion and the top cover plate are connected by using the circlip or by means of riveting, a fixing force is low. After long-time use, the electrode terminal is easily separated from the top cover plate, which leads to relatively low safety of the top cover assembly and reduces reliability of use of the top cover assembly. In addition, it can be seen from the above description that there are many steps to connect the electrode terminal with the top cover plate in the related technology, and the process is complex, resulting in low production efficiency.

SUMMARY

The present disclosure discloses a manufacturing method of a top cover assembly, a top cover assembly and an energy storage device, which can improve production efficiency of the top cover assembly.

In order to achieve the above object, in a first aspect, the present disclosure discloses a manufacturing method of a top cover assembly, including: placing a top cover plate, which is provided with an outlet hole; placing an electrode terminal on one side of the top cover plate, and covering the outlet hole, so that a first space is defined between the top cover plate and the electrode terminal; placing a connector on the side of the top cover plate that is used for placing the electrode terminal, wherein the connector has a first end portion surrounding a peripheral surface of the electrode terminal, and the connector has a second end portion in contact with the top cover plate; a second space is defined between the first end portion of the connector and the peripheral surface of the electrode terminal; and the second space is communicated with the first space; injecting a molten plastic material into the second space to fill the second space and the first space; standing for time t to harden the molten plastic material to form an injection-molded member, thereby connecting the connector to the electrode terminal through the injection-molded member; and welding the second end portion of the connector to the top cover plate.

In the present disclosure, to achieve the objective of connecting the electrode terminal to the top cover plate, the first end portion of the connector is first connected with the electrode terminal by means of injection molding, and the second end portion of the connector is then welded to the top cover plate by means of welding, thereby achieving the objective of connecting the electrode terminal to the top cover plate. Compared with the related technology in which the electrode terminal is connected with the top cover plate by using a circlip or by means of riveting, on one hand, the manufacturing method has fewer steps, a simpler process and higher production efficiency. On the other hand, the electrode terminal will not be separated from the top cover plate, which improves reliability of use of the top cover assembly.

In addition, in a general case, an injection molding procedure has a relatively high reject ratio, and a welding procedure has a relatively low reject ratio. In the present disclosure, the first end portion of the connector is first connected with the electrode terminal by means of injection molding, and the second end portion of the connector is then welded to the top cover plate by means of welding. Compared with the prior art, a manner in which the second end portion of the connector is first welded to the top cover plate by means of welding and the first end portion of the connector is then connected with the electrode terminal by means of injection molding, the above manner of the present disclosure can be used to find defective products in time, reduce welding processes and improve production efficiency.

Optionally, the step that a molten plastic material is injected into the second space to fill the second space and the first space includes:

An injection mold covers a peripheral side of the first end portion of the connector, so that the first end portion of the connector and the peripheral surface of the electrode terminal are located in an inner cavity of the injection mold, and the second end portion of the connector is exposed outside the inner cavity of the injection mold.

The molten plastic material is injected into the inner cavity of the injection mold through an injection hole of the injection mold to enable the molten plastic material to fill the second space and the first space.

The molten plastic material is injected into the inner cavity of the injection mold through the injection hole of the injection mold. The injection mold can achieve a limiting effect on the molten plastic material, so that the molten plastic material can better fill the second space and the first space.

Optionally, the injecting the molten plastic material into the inner cavity of the injection mold through an injection hole of the injection mold to enable the molten plastic material to fill the second space and the first space includes: forming a third space between the first end portion of the connector and the injection mold, wherein the first end portion of the connector is provided with a through hole communicated with the second space and the third space; and injecting the molten plastic material into the inner cavity of the injection mold through the injection hole of the injection mold to enable the molten plastic material to fill the first space, the second space and the third space by flowing through the third space, the through hole, the second space and the first space in sequence.

The third space is defined between the first end portion of the connector and the injection mold, and the molten plastic material is enabled to fill the first space, the second space and the third space through the third space, the through hole, the second space and the first space in sequence, so that the first end portion of the connector is embedded in the molten plastic material in the second space and the third space. In this way, the first end portion of the entire connector will be encircled by the molten plastic material. Therefore, the phenomenon that the first end portion of the connector is in contact with the peripheral surface of the electrode terminal can be better avoided.

Optionally, the injecting the molten plastic material into the inner cavity of the injection mold by using an injection hole of the injection mold includes:

The molten plastic material is injected into the inner cavity of the injection mold at a preset speed through the injection hole of the injection mold. The preset speed is within a range of 18 g/s to 25 g/s.

The preset speed is within a range of 18 g/s to 25 g/s. When the preset speed is within the range of 18 g/s to 25 g/s, the inventors have discovered through researches that on the one hand, efficiency of injecting the molten plastic material into the inner cavity of the injection mold is relatively high; and on the other hand, no bubbles will be generated in the molten plastic material injected into the inner cavity of the injection mold.

Optionally, a volume of the molten plastic material injected into the inner cavity of the injection mold is V, wherein $1.4 \text{ cm}^3 \leq V \leq 1.6 \text{ cm}^3$.

Due to $1.4 \text{ cm}^3 \leq V \leq 1.6 \text{ cm}^3$, the molten plastic material can be enabled to fully fill the inner cavity of the injection mold, so that such a phenomenon of a hollow portion in the inner cavity of the injection mold can be avoided.

Optionally, the placing an electrode terminal on one side of the top cover plate, and covering the outlet hole, so that a first space is defined between the top cover plate and the electrode terminal includes: placing a sealing member surrounding the outlet hole on one side of the top cover plate; and placing the electrode terminal on the sealing member, and covering the outlet hole, so that the first space is defined between the top cover plate and the electrode terminal.

The electrode terminal is placed on the sealing member, and the sealing member can achieve an effect of isolating the electrode terminal from the top cover plate, so that it is very convenient achieve an objective of forming the first space between the top cover plate and the electrode terminal.

Optionally, a thickness of the sealing member in a direction perpendicular to the top cover plate is greater than a width of the first space in the direction perpendicular to the top cover plate.

The thickness of the sealing member in the direction perpendicular to the top cover plate is greater than the width of the first space in a direction perpendicular to the top cover plate, so that it can be ensured that when the electrode terminal is placed on the sealing member, the first space is in interference fit with the sealing member, which improves a sealing effect of the sealing member on the first space.

Optionally, $1 \text{ min} \leq t \leq 3 \text{ min}$.

In case of $1 \text{ min} \leq t \leq 3 \text{ min}$, the injection-molded member can be better hardened, and the standing time will not be too long to cause efficiency of manufacturing the top cover assembly to be relatively low.

Optionally, the molten injection-molded member is molten polyphenylene sulfite (PPS) material.

The molten plastic material may be a PPS solution. When the molten plastic material is molten PPS material, since PPS is high temperature resistant and is stable in nature, such a phenomenon that the molten PPS material is melted again at a high temperature after being hardened to form an injection-molded member can be avoided.

In the second aspect, the present disclosure discloses a top cover assembly, the top cover assembly is manufactured by any method in the first aspect above.

In this embodiment of the present disclosure, the top cover assembly is manufactured by any method in the first aspect above; the manufacturing method of the above top cover assembly includes fewer steps, a simpler process and higher production efficiency; and in the manufactured top cover assembly, the electrode terminal will not be separated from the top cover plate. Therefore, the top cover assembly can have relatively high reliability of use and relatively high production efficiency.

In the third aspect, the present disclosure discloses an energy storage device, the energy storage device including the top cover assembly as described in the second aspect above.

The top cover assembly has relatively high reliability of use and high production efficiency. Therefore, the energy storage device can have relatively high reliability and high production efficiency.

Compared with the prior art, the present disclosure has the beneficial effects below: In the present disclosure, to achieve the objective of connecting the electrode terminal to the top cover plate, the first end portion of the connector is first connected with the electrode terminal by means of injection molding, and the second end portion of the connector is then welded to the top cover plate by means of welding, thereby achieving the objective of connecting the electrode terminal to the top cover plate. Compared with the related technology in which the electrode terminal is connected with the top cover plate by using a circlip or by means of riveting, on the one hand, the manufacturing method has fewer steps, a simpler process and higher production efficiency. On the other hand, the electrode terminal will not be separated from the top cover plate, which improves reliability of use of the top cover assembly.

In addition, in a general case, an injection molding procedure has a relatively high reject ratio, and a welding procedure has a relatively low reject ratio. In the present disclosure, the first end portion of the connector is first connected with the electrode terminal by means of injection molding, and the second end portion of the connector is then welded to the top cover plate by means of welding. The welding procedure can be stopped when it is found that defective products are produced in the injection molding procedure. Compared with a manner in which the second end portion of the connector is first welded to the top cover plate by means of welding and the first end portion of the connector is then connected with the electrode terminal by means of injection molding, the above manner can be used to find defective products in time, reduce welding processes and improve production efficiency.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

Figure 1:
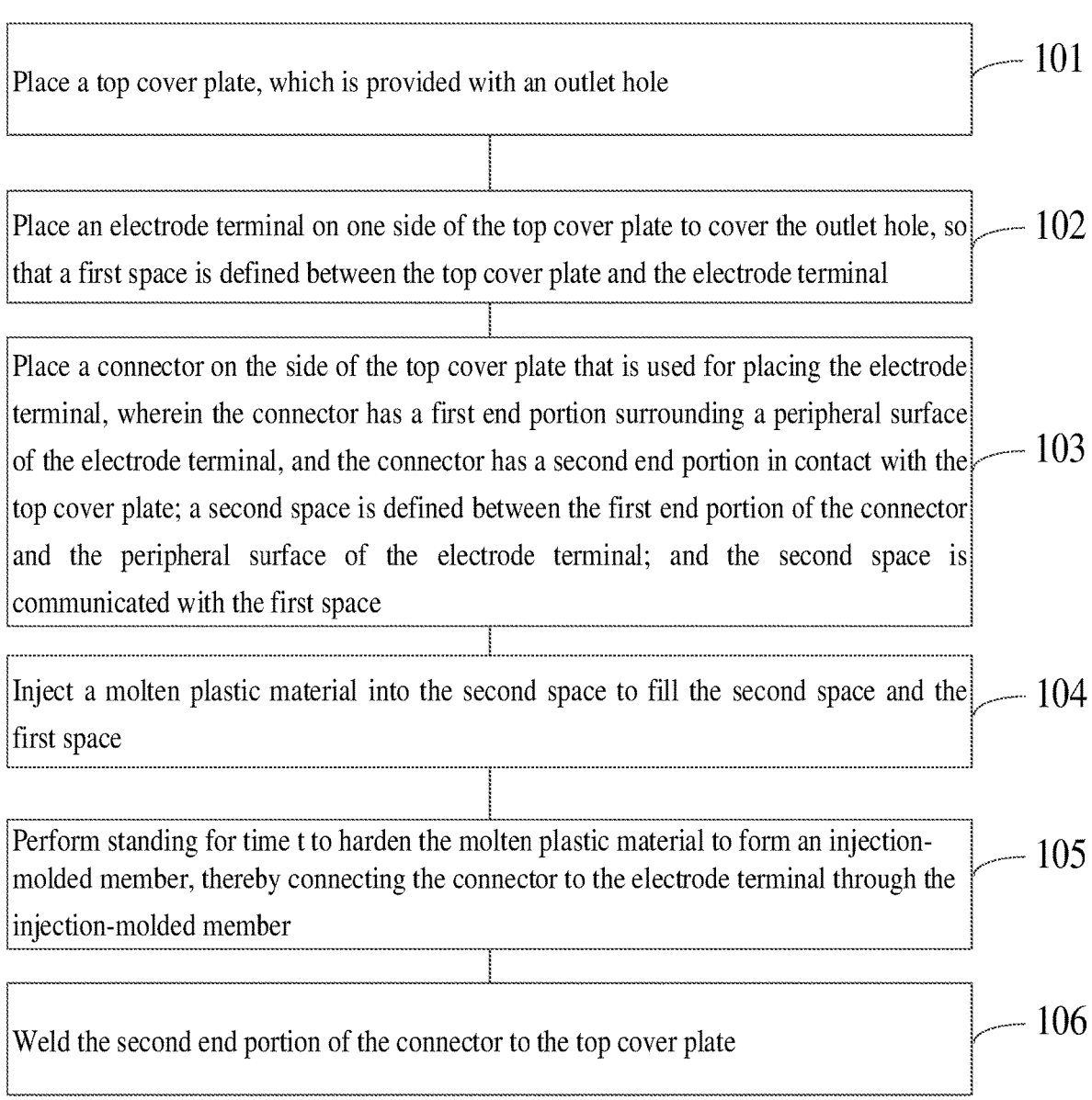
FIG. 1 is a flow chart of a manufacturing method of a top cover assembly provided by an embodiment of the present disclosure.

Main reference numerals in the drawings:

1: top cover plate; 10: first space; 11: outlet hole;
2: electrode terminal; 20: second space;
3: connector; 30: third space; 31: first end portion; 32: second end portion; 33: through hole;
4: injection-molded member;
5: sealing member;
100: top cover assembly; and 200: energy storage device.

DETAILED DESCRIPTION OF EMBODIMENTS

The following will be combined with the accompanying drawings of embodiments of the present disclosure, The technical scheme in the embodiment of the invention is clearly and completely described. Obviously, the described embodiments are part of the embodiments of the present disclosure, and not all embodiments. Based on the embodiments of the present disclosure, all other embodiments attained by those of ordinary skill in the art without inventive effort are within the scope of the present disclosure.

In the present disclosure, orientations or positional relationships indicated by the terms "upper", "lower", "left", "right", "front", "rear", "top", "bottom", "inner", "outer", "middle", "vertical", "horizontal", "transverse", "longitudinal", etc. are based on orientations or positional relationships shown in the drawings. These terms are mainly used to better describe the present disclosure and embodiments of the present disclosure, and are not used to limit that the indicated device, element, or component must have a specific orientation, or be constructed and operated in a specific orientation.

Furthermore, the above-described partial terms may be used in addition to indicating azimuth or positional relationships. It may also be used to refer to other meanings, such as the term "above" in some cases may also be used to refer to certain dependencies or connectivity. The specific meanings of these terms in the present disclosure will be understood by those of ordinary skill in the art as the case may be.

In addition, the terms "mounted", "disposed", "provided", "connected", "connected", and "socket" are to be construed broadly to mean, for example, a fixed connection, a detachable connection, or an integral construction; It may be a mechanical connection, or an electrical connection; The specific meaning of the above-mentioned terms in the present disclosure will be understood by those of ordinary skill in the art as the case may be, either directly, or indirectly, via an intermediate medium, or internal communication between two devices, elements, or components.

In addition, the terms "first", "second", etc., are used primarily to distinguish different devices, elements or components (the specific type and construction may be the same or different) and are not used to indicate or imply the relative importance or quantity of the indicated device, element or component. Unless otherwise stated, "plurality" means two or more.

The present disclosure is further described below in detail in combination with the accompanying drawings and embodiments.

Embodiment I

Figure 2:
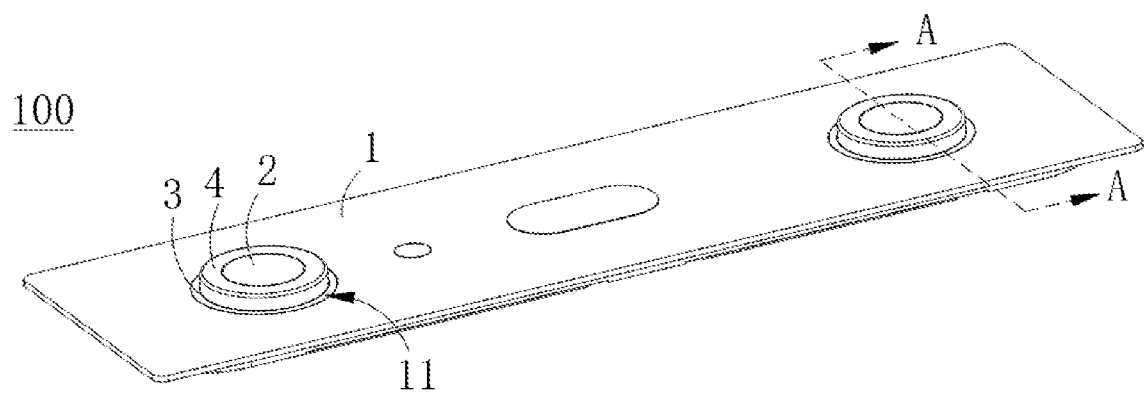
FIG. 2 is a schematic structural diagram of a top cover assembly provided by an embodiment of the present disclosure.
Figure 3:
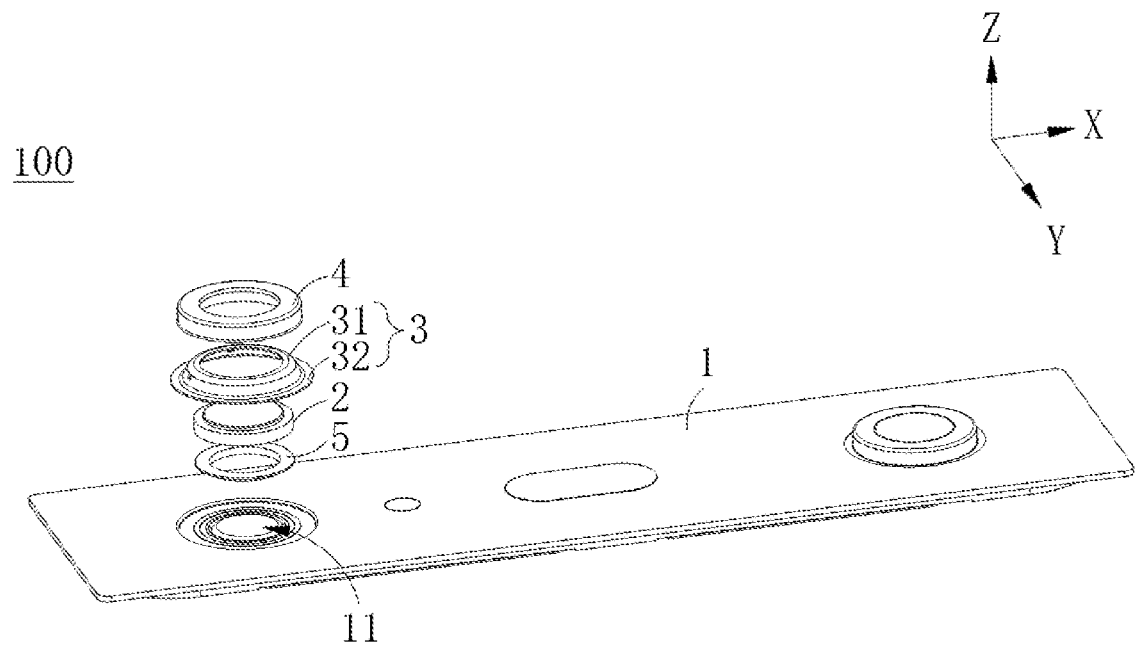
FIG. 3 is a partially exploded diagram of the top cover assembly in FIG. 2.
Figure 4:
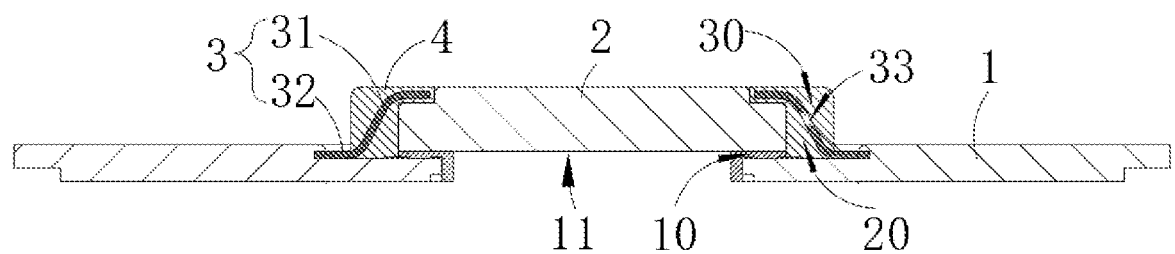
FIG. 4 is a sectional diagram of the top cover assembly in FIG. 2 at a position A-A.

FIG. 1 is a flow chart of a manufacturing method of a top cover assembly provided by an embodiment of the present disclosure; FIG. 2 is a schematic structural diagram of a top cover assembly provided by an embodiment of the present disclosure; FIG. 3 is a partially exploded diagram of the top cover assembly in FIG. 2; and FIG. 4 is a sectional diagram of the top cover assembly in FIG. 2 at a position A-A.

Referring to FIG. 1, FIG. 2, FIG. 3 and FIG. 4, the manufacturing method of the top cover assembly includes:

Step 101: A top cover plate 1 is placed. The top cover plate 1 is provided with an outlet hole 11.

Step 102: An electrode terminal 2 is placed on one side of the top cover plate 1 and covers the outlet hole 11, so that a first space 10 is defined between the top cover plate 1 and the electrode terminal 2.

Step 103: A connector 3 is placed on the side of the top cover plate 1 that is used for placing the electrode terminal 2. The connector 3 has a first end portion 31 surrounding a peripheral surface of the electrode terminal 2, and the connector 3 has a second end portion 32 in contact with the top cover plate 1. A second space 20 is defined between the first end portion 31 of the connector 3 and the peripheral surface of the electrode terminal 2. The second space 20 is communicated with the first space 10.

Step 104: A molten plastic material is injected into the second space 20 to fill the second space 20 and the first space 10.

Step 105: Standing is performed for time t to harden the molten plastic material to form an injection-molded member 4, thereby connecting the connector 3 to the electrode terminal 2 through the injection-molded member 4.

Step 106: The second end portion 32 of the connector 3 is welded to the top cover plate 1.

In this embodiment of this application, during manufacturing of the top cover assembly, the electrode terminal 2 is first placed on one side of the top cover plate 1 and covers the outlet hole 11, and the first space 10 is defined between the electrode terminal 2 and the top cover plate 1, to avoid contact between the electrode terminal 2 and the top cover plate 1. The connector 3 is placed on the side of the top cover plate 1 that is used for placing the electrode terminal 2, so that the first end portion 31 of the connector 3 surrounds the peripheral surface of the electrode terminal 2, and the second end portion 32 of the connector 3 is in contact with the top cover plate 1; and the second space 20 is defined between the first end portion 31 of the connector 3 and the peripheral surface of the electrode terminal 2 to avoid contact between the first end portion 31 of the connector 3 and the electrode terminal 2. Next, the molten plastic material is injected into the second space 20 to fill the second space 20 and the first space 10. After standing for the time t, the molten plastic material is hardened to form the injection-molded member 4. After the molten plastic material is hardened to form the injection-molded member 4, the first end portion 31 of the connector 3 is connected with the electrode terminal 2 through the injection-molded member 4. After the first end portion 31 of the connector 3 is connected with the electrode terminal 2 through the injection-molded member 4, the second end portion 32 of the connector 3 is welded to the top cover plate 1. At this end, an objective of connecting the electrode terminal 2 to the top cover plate 1 is achieved, thereby achieving an objective of manufacturing the top cover assembly.

It can be seen that in the manufacturing method of the top cover assembly provided by the embodiment of the present disclosure, to achieve the objective of connecting the electrode terminal 2 to the top cover plate 1, the first end portion 31 of the connector 3 is first connected with the electrode terminal 2 by means of injection molding, and the second end portion 32 of the connector 3 is then welded to the top cover plate 1 by means of welding, thereby achieving the objective of connecting the electrode terminal 2 to the top cover plate 1. Compared with the related technology in which the electrode terminal 2 is connected with the top cover plate 1 through a circlip or by means of riveting, on the one hand, the manufacturing method has fewer steps, a simpler process and higher production efficiency. On the other hand, the electrode terminal will not be separated from the top cover plate, which improves reliability of use of the top cover assembly.

In addition, in a general case, an injection molding procedure has a relatively high reject ratio, and a welding procedure has a relatively low reject ratio. In the present disclosure, the first end portion 31 of the connector 3 is first connected with the electrode terminal 2 by means of injection molding, and the second end portion 32 of the connector 3 is then welded to the top cover plate 1 by means of welding. The welding procedure is stopped when it is found that defective products are produced in the injection molding procedure. Compared with a manner in which the second end portion 32 of the connector 3 is first welded to the top cover plate 1 by means of welding and the first end portion 31 of the connector 3 is then connected with the electrode terminal 2 by means of injection molding, the above manner is used to find defective products in time, reduce welding processes and improve production efficiency.

Optionally, the step that a molten plastic material is injected into the second space 20 to fill the second space 20 and the first space 10 includes:

An injection mold covers a peripheral side of the first end portion 31 of the connector 3, so that the first end portion 31 of the connector 3 and the peripheral surface of the electrode terminal 2 are located in an inner cavity of the injection mold and that the second end portion 32 of the connector 3 is exposed outside the inner cavity of the injection mold.

The molten plastic material is injected into the inner cavity of the injection mold through an injection hole of the injection mold to enable the molten plastic material to fill the second space 20 and the first space 10.

Optionally, the step that the molten plastic material is injected into the inner cavity of the injection mold through an injection hole of the injection mold to enable the molten plastic material to fill the second space 20 and the first space 10 includes:

A third space 30 is formed between the first end portion 31 of the connector 3 and the injection mold. The first end portion 31 of the connector 3 is provided with a through hole 33 communicated with the second space 20 and the third space 30. The molten plastic material is injected into the inner cavity of the injection mold through the injection hole of the injection mold to enable the molten plastic material to fill the first space 10, the second space 20 and the third space 30 through the third space 30, the through hole 33, the second space 20 and the first space 10 in sequence.

Optionally, the step that the molten plastic material is injected into the inner cavity of the injection mold through the injection hole of the injection mold includes:

The molten plastic material is injected into the inner cavity of the injection mold at a preset speed through the injection hole of the injection mold. The preset speed is within a range of 18 g/s to 25 g/s.

Optionally, a volume of the molten plastic material injected into the inner cavity of the injection mold is V, wherein $1.4\ cm^3 \leq V \leq 1.6\ cm^3$.

Optionally, the step that an electrode terminal 2 is placed on one side of the top cover plate 1 and covers the outlet hole 11, so that the first space 10 is formed between the top cover plate 1 and the electrode terminal 2, includes:

A sealing member 5 surrounding the outlet hole 11 is placed on one side of the top cover plate 1.

The electrode terminal 2 is placed on the sealing member 5 to form the first space 10 between the top cover plate 1 and the electrode terminal 2.

Optionally, a thickness of the sealing member 5 in a direction perpendicular to the top cover plate 1 is greater than a width of the first space 10 in the direction perpendicular to the top cover plate 1.

Optionally, $1\ min \leq t \leq 3\ min$.

Optionally, the molten injection-molded member is a molten polyphenylene sulfite (PPS) material.

All the above optional technical solutions may form the optional embodiments of the present disclosure according to any combinations, and this embodiment of the present disclosure will not describe them one by one again.

Figure 5:
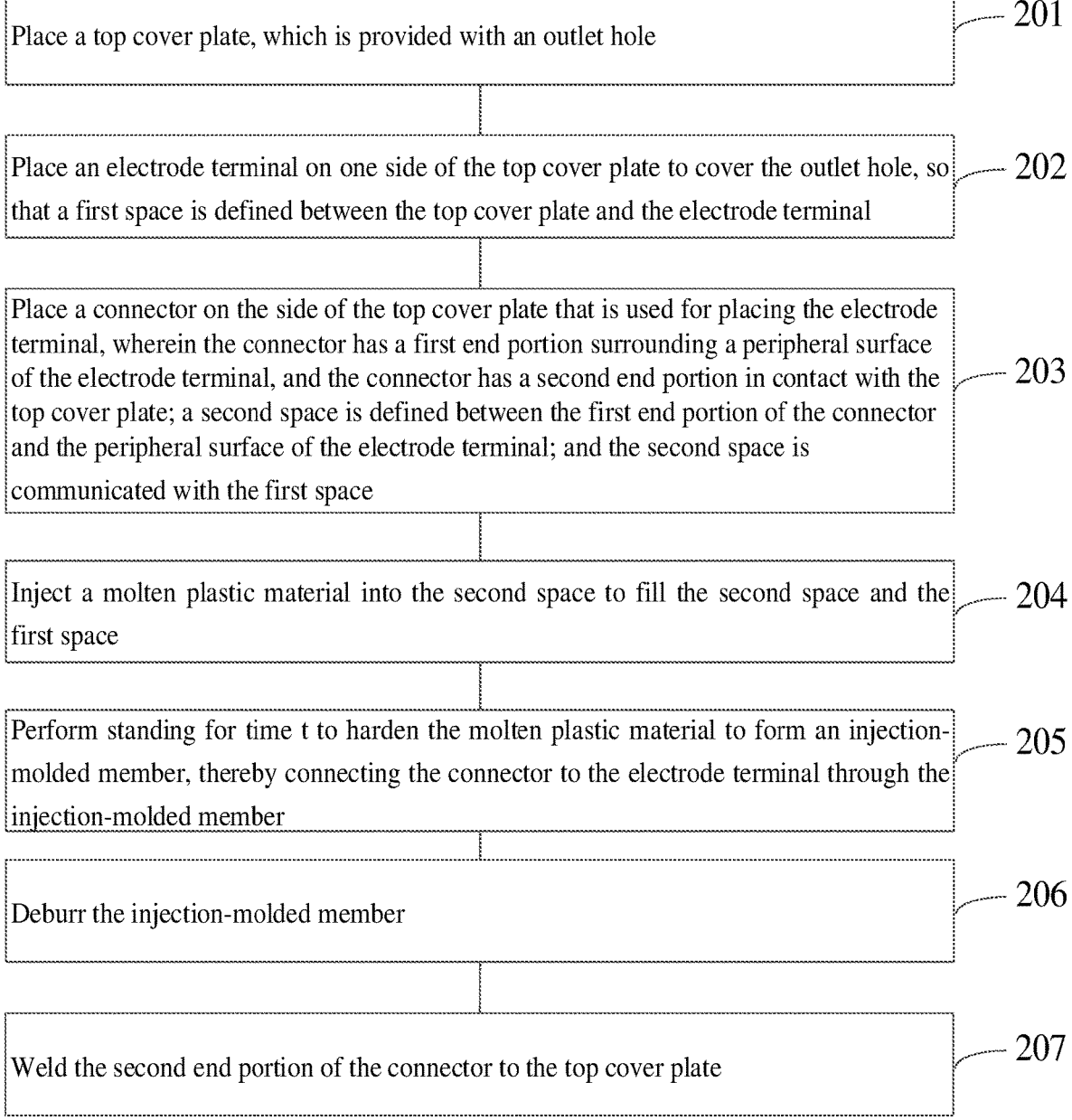
FIG. 5 is a flow chart of another manufacturing method of a top cover assembly provided by an embodiment of the present disclosure.

FIG. 5 is a flow chart of another manufacturing method of a top cover assembly provided by an embodiment of the present disclosure. Referring to FIG. 3, FIG. 4 and FIG. 5, the method includes:

Step 201: A top cover plate 1 is placed. The top cover plate 1 is provided with an outlet hole 11.

The top cover plate 1 may be a polished aluminum plate or an iron plate. This embodiment of the present disclosure does not limit this. The outlet hole 11 may be circular, square, etc. The present disclosure is not limited to this embodiment.

In addition, a quantity of the outlet hole 11 may be two or other possible values. When there are two outlet holes 11, the outlet holes 11 may include a positive electrode outlet hole and a negative electrode outlet hole.

It should be noted that the above outlet holes 11 may be formed by means of drilling, or may be formed by means of laser cutting. The present disclosure is not limited to this embodiment.

Step 202: An electrode terminal 2 is placed on one side of the top cover plate 1 and covers the outlet hole 11, so that a first space 10 is formed between the top cover plate 1 and the electrode terminal 2.

Step 202 described above is implemented in various manners. In a first possible implementation, it may be implemented by following step 2021 to step 2022:

Step 2021: A sealing member 5 surrounding the outlet hole 11 is placed on one side of the top cover plate 1.

The sealing member 5 may be a rubber sealing ring or other possible elements. The present disclosure is not limited to this embodiment.

When the sealing member 5 is the rubber sealing ring, that the sealing member 5 surrounds the outlet hole 11 may mean that an axial line of the sealing member 5 is coaxial with that of the outlet hole 11, and a body of the sealing member 5 surrounds a periphery of the outlet hole 11.

Step 2022: The electrode terminal 2 is placed on one side of the top cover plate 1 and covers the outlet hole 11, so that a first space 10 is formed between the top cover plate 1 and the electrode terminal 2.

The electrode terminal 2 is placed on the sealing member 5, so that the sealing member 5 achieves an effect of isolating the electrode terminal 2 from the top cover plate 1, thereby conveniently achieving an objective of forming the first space 10 between the top cover plate 1 and the electrode terminal 2.

The electrode terminal 2 covers the outlet hole 11, so that it is very convenient to connect a mandrel or other elements in an inner cavity of an energy storage device with the electrode terminal 2 through the outlet hole 11.

In order to ensure that a width of the first space 10 in a direction perpendicular to the top cover plate 1 is equal to a preset width, in some embodiments, referring to FIG. 3, a thickness of the sealing member 5 in the direction (a Z-axial direction in FIG. 3) perpendicular to the top cover plate 1 is greater than the width of the first space 10 in a direction perpendicular to the top cover plate 1.

The thickness of the sealing member 5 in the direction (the Z-axial direction in FIG. 3) perpendicular to the top cover plate 1 is slightly greater than the width of the first space 10 in a direction perpendicular to the top cover plate 1, so that it can be ensured that the first space 10 is in interference fit with the sealing member 5 when the electrode terminal 2 is placed on the sealing member 5, which improves a sealing effect of the sealing member 5 in the first space 10.

The first space 10 is formed between the top cover plate 1 and the electrode terminal 2, so that such a phenomenon that the top cover plate 1 is in contact with the electrode terminal 2 can be avoided, and such a phenomenon of a short circuit of the energy storage device caused by the contact between the top cover plate 1 and the electrode terminal 2 can be avoided.

In a second possible implementation, the electrode terminal 2 is placed on one side of the top cover plate 1 and covers the outlet hole 11, so that the first space 10 is defined between the top cover plate 1 and the electrode terminal 2. The electrode terminal 2 is hung up relative to the top cover plate 1, so that the electrode terminal 2 covers the outlet hole 11, and the first space 10 is defined between the top cover plate 1 and the electrode terminal 2.

Of course, there is another way to enable, when the electrode terminal 2 is placed on one side of the top cover plate 1, the electrode terminal 2 to cover the outlet hole 11, and reserve the first space 10 between the top cover plate 1 and the electrode terminal 2. This embodiment of the present disclosure does not enumerate manners herein.

The width of the first space 10 may be 0.1 mm, 0.2 mm, 0.5 mm or any other possible values in the direction perpendicular to the top cover plate 1. The present disclosure is not limited to this embodiment.

Step 203: A connector 3 is placed on the side of the top cover plate 1 that is used for placing the electrode terminal 2, wherein the connector 3 has a first end portion 31 surrounding a peripheral surface of the electrode terminal 2 and a second end portion 32 in contact with the top cover plate 1. A second space 20 is defined between the first end portion 31 of the connector 3 and the peripheral surface of the electrode terminal 2, and the second space 20 is communicated with the first space 10.

The connector 3 may be manually placed on the side of the top cover plate 1 provided with the electrode terminal 2, or the connector 3 may be placed on the side of the top cover plate 1 provided with the electrode terminal 2 through mechanical equipment or a mold. The present disclosure is not limited to this embodiment.

The second space 20 is defined between the first end portion 31 of the connector 3 and the peripheral surface of the electrode terminal 2, so that such a phenomenon that the first end portion 31 of the connector 3 is in contact with the peripheral surface of the electrode terminal 2 can be avoided, and such a phenomenon of a short circuit of an energy storage device caused by the fact that the electrode terminal 2 is conducted to the top cover plate 1 through the connector 3 can be avoided.

Step 204: A molten plastic material is injected into the second space 20 to fill the second space 20 and the first space 10.

Step 204 is implemented in various manners. In a first possible implementation, a nozzle of a hot melt gun that is used for spraying the molten plastic material is placed in the second space 20. The molten plastic material can be injected into the second space 20 directly through the hot melt gun to enable plastic liquid to fill the second space 20 and the first space 10.

In a second possible implementation, it may be implemented by following step 2041 to step 2042:

Step 2041: An injection mold covers a peripheral side of the first end portion 31 of the connector 3, so that the first end portion 31 of the connector 3 and the peripheral surface of the electrode terminal 2 are located in an inner cavity of the injection mold and that the second end portion 32 of the connector 3 is exposed outside the inner cavity of the injection mold.

The injection mold can cover the peripheral side of the first end portion 31 of the connector 3 through mechanical equipment, or the injection mold can manually cover the peripheral side of the first end portion 31 of the connector 3. The present disclosure is not limited this embodiment.

Step 2042: The molten plastic material is injected into the inner cavity of the injection mold through an injection hole of the injection mold to enable the molten plastic material to fill the second space 20 and the first space 10.

The molten plastic material is injected into the inner cavity of the injection mold through the injection hole of the injection mold. The injection mold can achieve a limiting effect on the molten plastic material, so that the molten plastic material can better fill the second space 20 and the first space 10.

In order to better inject the molten plastic material into the inner cavity of the injection mold through the injection hole of the injection mold and to avoid bubbles generated in the molten plastic material injected into the inner cavity of the injection mold, in some embodiments, the molten plastic material is injected into the inner cavity of the injection mold at a preset speed through the injection hole of the injection mold. The preset speed is within a range of 18 g/s to 25 g/s. When the preset speed is within the range of 18 g/s to 25 g/s, the inventors have discovered through researches that on one hand, efficiency of injecting the molten plastic material into the inner cavity of the injection mold is relatively high; and on the other hand, no bubbles are generated in the molten plastic material injected into the inner cavity of the injection mold.

For example, the preset speed may be 18 g/s, 20 g/s. 25 g/s, etc. The present disclosure is not limited to this embodiment.

In order to enable the molten plastic material to fully fill the inner cavity of the injection mold, in some embodiments, a volume of the molten plastic material in the inner cavity of the injection mold is V, where $1.4 \text{ cm}^3 \leq V \leq 1.6 \text{ cm}^3$. Due to $1.4 \text{ cm}^3 \leq V \leq 1.6 \text{ cm}^3$, the molten plastic material can be enabled to fully fill the inner cavity of the injection mold, so that such a phenomenon of a hollow portion in the inner cavity of the injection mold can be avoided.

In some embodiments, referring to FIG. 4, a third space 30 is formed between the first end portion 31 of the connector 3 and the injection mold. The first end portion 31 of the connector 3 is provided with a through hole 33 communicated with the second space 20 and the third space 30. The molten plastic material is injected into the inner cavity of the injection mold through the injection hole of the injection mold to enable the molten plastic material to fill the first space 10, the second space 20 and the third space 30 by flowing through the third space 30, the through hole 33, the second space 20 and the first space 10 in sequence.

The third space 30 is defined between the first end portion 31 of the connector 3 and the injection mold, and the molten plastic material is enabled to fill the first space 10, the second space 20 and the third space 30 by flowing through the third space 30, the through hole 33, the second space 20 and the first space 10 in sequence, so that the first end portion 31 of the connector 3 is embedded in the molten plastic material in the second space 20 and the third space 30. In this way, the first end portion 31 of the entire connector 3 is encircled by the molten plastic material. Therefore, the phenomenon that the first end portion 31 of the connector 3 is in contact with the peripheral surface of the electrode terminal 2 can be better avoided.

The above molten plastic material may be PPS solution. When the molten plastic material is molten PPS material, since PPS is high temperature resistant and is stable in nature, such a phenomenon that the molten PPS material is melted again at a high temperature after being hardened to form an injection-molded member 4 can be avoided.

Step 205: After standing for time t, the molten plastic material is hardened to form an injection-molded member 4, to connect the connector 3 to the electrode terminal 2 through the injection-molded member 4.

After standing for time t, the molten plastic material will be slowly hardened to form the injection-molded member 4, so that an objective of connecting the connector 3 with the electrode terminal 2 can be achieved, where 1 min≤t≤3 min. In case of 1 min≤t≤3 min, the injection-molded member 4 can be better hardened, and the standing time will not be too long to cause efficiency of manufacturing the top cover assembly to be relatively low.

For example, t may be 1 min, 2 min, 3 min, etc., as long as 1 min≤t≤3 min. The present disclosure is not limited to this embodiment.

First time is preset in advance.

Step 206: The injection-molded member 4 is deburred. By means of deburring the injection-molded member 4, a surface of the injection-molded member 4 may be smooth, which improves appearance quality of the whole top cover assembly.

Step 207: The second end portion 32 of the connector 3 is welded to the top cover plate 1.

The second end portion 32 of the connector 3 can be welded to the top cover plate 1 through laser welding equipment, or the second end portion 32 of the connector 3 can be welded to the top cover plate 1 through a welding gun, etc. The present disclosure is not limited to this embodiment.

In this embodiment of this application, during manufacturing of the top cover assembly, the electrode terminal 2 is first placed on one side of the top cover plate 1 and covers the outlet hole 11, and the first space 10 is defined between the electrode terminal 2 and the top cover plate 1, to avoid contact between the electrode terminal 2 and the top cover plate 1. The connector 3 is placed on the side of the top cover plate 1 that is used for placing the electrode terminal 2, so that the first end portion 31 of the connector 3 surrounds the peripheral surface of the electrode terminal 2, and the second end portion 32 of the connector 3 is in contact with the top cover plate 1; and the second space 20 is formed between the first end portion 31 of the connector 3 and the peripheral surface of the electrode terminal 2 to avoid contact between the first end portion 31 of the connector 3 and the electrode terminal 2. Next, the molten plastic material is injected into the second space 20. After standing for the time t, the molten plastic material is hardened to form the injection-molded member 4. After the molten plastic material is hardened to form the injection-molded member 4, the first end portion 31 of the connector 3 can be connected with the electrode terminal 2 through the injection-molded member 4. After the first end portion 31 of the connector 3 can be connected with the electrode terminal 2 through the injection-molded member 4, the second end portion 32 of the connector 3 is welded to the top cover plate 1. At this end, an objective of connecting the electrode terminal 2 to the top cover plate 1 is achieved, thereby achieving an objective of manufacturing the top cover assembly.

It can be seen that in the manufacturing method of the top cover assembly provided by the embodiment of the present disclosure, to achieve the objective of connecting the electrode terminal 2 to the top cover plate 1, the first end portion 31 of the connector 3 is first connected with the electrode terminal 2 by means of injection molding, and the second end portion 32 of the connector 3 is then welded to the top cover plate 1 by means of welding, thereby achieving the objective of connecting the electrode terminal 2 to the top cover plate 1. Compared with the related technology in which the electrode terminal 2 is connected with the top cover plate 1 through a circlip or by means of riveting, on one hand, the manufacturing method has fewer steps, a simpler process and higher production efficiency. On the other hand, the electrode terminal will not be separated from the top cover plate, which improves reliability of use of the top cover assembly.

In addition, in a general case, an injection molding procedure has a relatively high reject ratio, and a welding procedure has a relatively low reject ratio. In the present disclosure, the first end portion 31 of the connector 3 is first connected with the electrode terminal 2 by means of injection molding, and the second end portion 32 of the connector 3 is then welded to the top cover plate 1 by means of welding. The welding procedure can be stopped when it is found that defective products are produced in the injection molding procedure. Compared with a manner in which the second end portion 32 of the connector 3 is first welded to the top cover plate 1 by means of welding and the first end portion 31 of the connector 3 is then connected with the electrode terminal 2 by means of injection molding, the above manner can be used to find defective products in time, reduce welding processes and improve production efficiency.

Embodiment II

This embodiment of the present disclosure provides a top cover assembly 100. Referring to FIG. 2, the top cover assembly 100 is manufactured by any method in Embodiment I above.

In this embodiment of the present disclosure, the top cover assembly 100 is manufactured by any method in Embodiment I above; the manufacturing method of the above top cover assembly 100 includes fewer steps, a simpler process and higher production efficiency; and in the manufactured top cover assembly 100, the electrode terminal is not separated from the top cover plate. Therefore, the top cover assembly can have relatively high reliability of use and relatively high production efficiency.

Embodiment III

Figure 6:
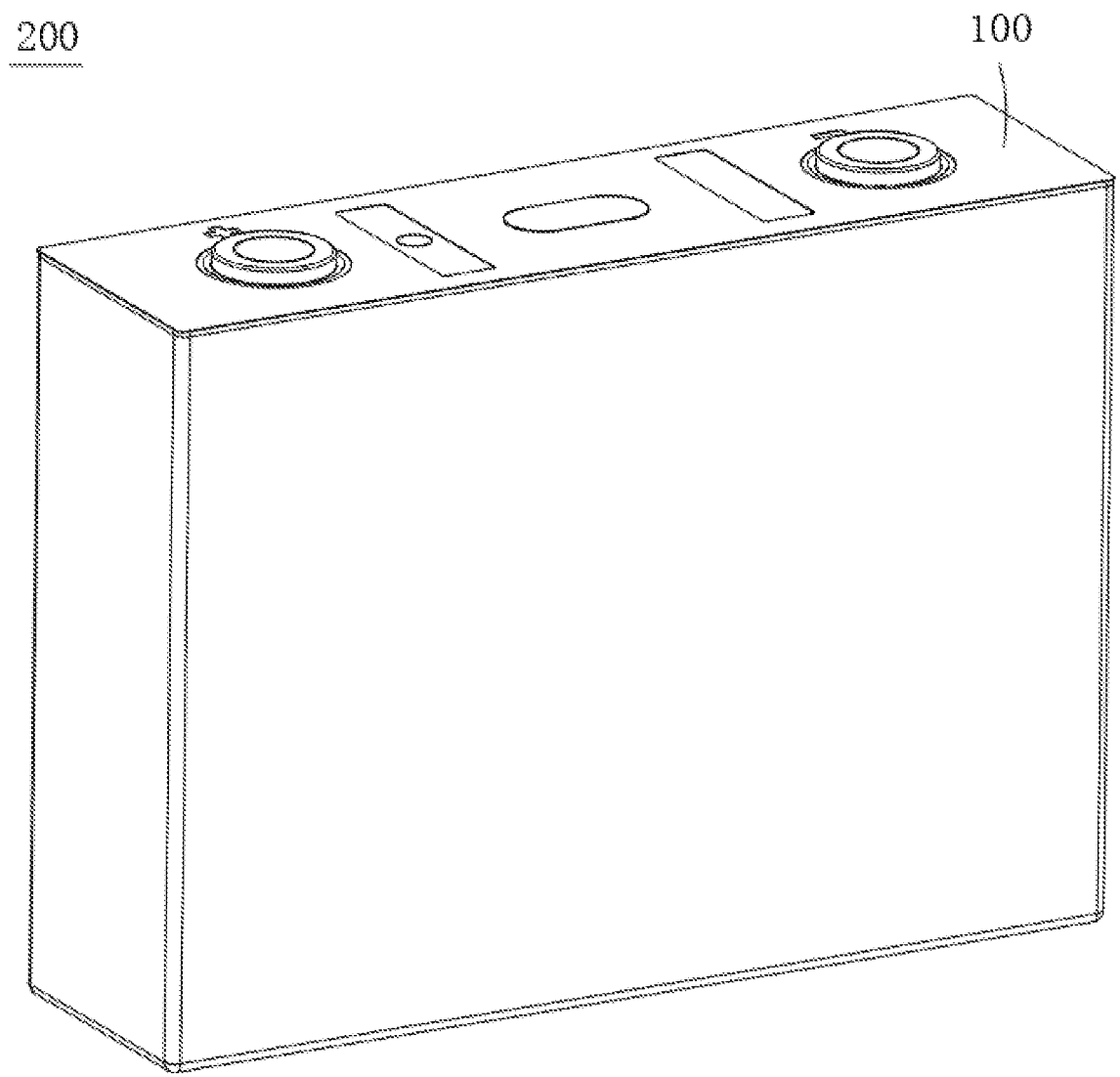
FIG. 6 is a schematic structural diagram of an energy storage device provided by an embodiment of the present disclosure.

FIG. 6 is a schematic structural diagram of an energy storage device 200 provided by an embodiment of the present disclosure. Referring to FIG. 6, the energy storage device 200 includes the top cover assembly 100 in Embodiment II above.

The structure of the top cover assembly 100 can be the same as that of the top cover assembly 100 in Embodiment II above, and can bring the same or similar beneficial effects. For details, reference is made to the description in Embodiment II, which will not be repeated in this embodiment of the present disclosure.

In this embodiment of the present disclosure, the top cover assembly 100 has relatively high reliability of use and high production efficiency. Therefore, the energy storage device 200 can have relatively high reliability and high production efficiency.

The energy storage device of the present disclosure may be a cell, or may be a device with an electric energy storage function, such as a battery module, a battery pack, or a battery cluster that includes a cell.

It should be finally noted that the above various embodiments are only used to describe the technical solutions of the present disclosure, and not intended to limit the present disclosure. Although the present disclosure has been described in detail with reference to the foregoing embodiments, those ordinarily skilled in the art should understand that they can still modify the technical solutions described in all the foregoing embodiments, or equivalently replace some or all of the technical features, and these modifications or replacements do not depart the essences of the corresponding technical solutions from the spirit and scope of the technical solutions of all the embodiments of the present disclosure.

What is claimed is:

1. A method for manufacturing a top cover assembly, the method comprising:
   providing a top cover plate, wherein the top cover plate has an outlet hole;
   placing an electrode terminal above one side of the top cover plate, and covering the outlet hole with the electrode terminal to define a first space between the top cover plate and the electrode terminal;
   placing a connector on the one side of the top cover plate, wherein the connector has a first end portion surrounding a peripheral surface of the electrode terminal and a second end portion in contact with the top cover plate, wherein a second space is defined between the first end portion of the connector and the peripheral surface of the electrode terminal, wherein the second space is communicated with the first space;
   injecting a molten plastic material into the second space to fill the second space and the first space;
   standing for a time t to harden the molten plastic material to form an injection-molded member, thereby connecting the connector to the electrode terminal through the injection-molded member; and
   welding the second end portion of the connector to the top cover plate; wherein
   the placing the electrode terminal above one side of the top cover plate, and covering the outlet hole with the electrode terminal to define the first space between the top cover plate and the electrode terminal comprises:
   hanging up the electrode terminal relative to the top cover plate, so that the electrode terminal covers the outlet hole, and the first space is defined between the top cover plate and the electrode terminal.

2. The method according to claim 1, wherein the injecting the molten plastic material into the second space to fill the second space and the first space comprises:
   covering a peripheral side of the first end portion of the connector by an injection mold, so that the first end portion of the connector and the peripheral surface of the electrode terminal are located in an inner cavity of the injection mold, and the second end portion of the connector is exposed outside the inner cavity of the injection mold; and
   injecting the molten plastic material into the inner cavity of the injection mold through an injection hole of the injection mold to enable the molten plastic material to fill the second space and the first space.

3. The method according to claim 2, wherein the injecting the molten plastic material into the inner cavity of the injection mold through the injection hole of the injection mold to enable the molten plastic material to fill the second space and the first space comprises:
   forming a third space between the first end portion of the connector and the injection mold, wherein the first end portion of the connector is provided with a through hole communicated with the second space and the third space; and
   injecting the molten plastic material into the inner cavity of the injection mold through the injection hole of the injection mold to enable the molten plastic material to fill the first space, the second space and the third space by flowing through the third space, the through hole, the second space and the first space in sequence.

4. The method according to claim 2, wherein the injecting the molten plastic material into the inner cavity of the injection mold through an injection hole of the injection mold comprises:
   injecting the molten plastic material into the inner cavity of the injection mold at a preset speed through the injection hole of the injection mold, wherein the preset speed is in a range of 18 g/s to 25 g/s.

5. The method according to claim 2, wherein a volume of the molten plastic material injected into the inner cavity of the injection mold is V, wherein $1.4\ cm^3 \leq V \leq 1.6\ cm^3$.

6. The method according to claim 1, wherein $1\ min \leq t \leq 3\ min$.

7. The method according to claim 1, wherein the molten plastic material is a molten polyphenylene sulfite (PPS) material.

\* \* \* \* \*